8689X
W. E. Arnold,
Horse Power.
Patented Mar. 13, 1835.
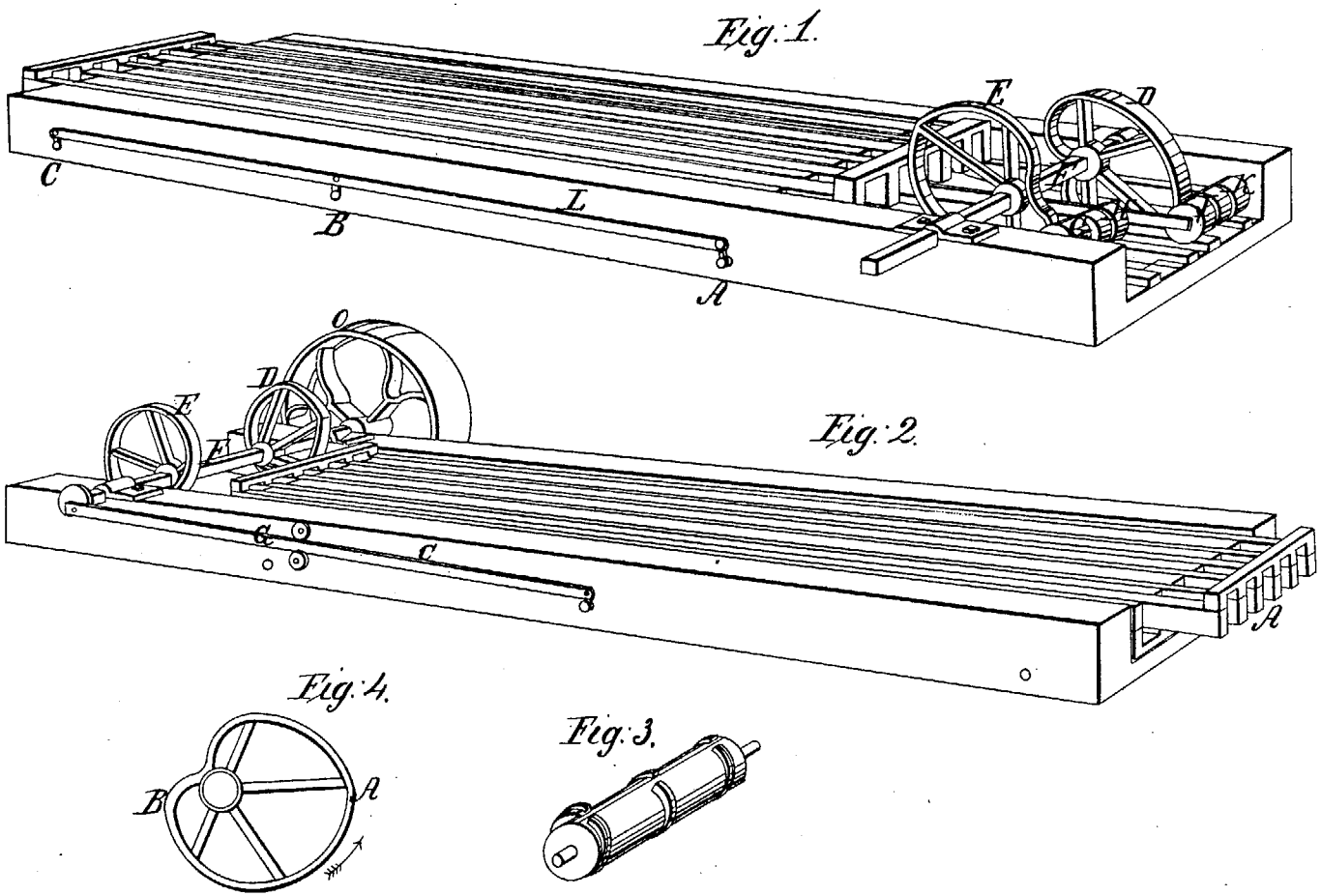
AM. PHOTO-LITHO. CO. N.Y. (OSBORNE'S PROCESS)

William E. Arnold, of Chatham, Conn: 8689X
Letters Patent

The schedule referred to in these Letters Patent and making part of the same, containing a description in the words of the said William E. Arnold himself of his improvement in a Horse power. —

---

To all persons to whom these presents shall come: Be it known that I William E. Arnold of Chatham in the County of Middlesex and State of Connecticut have invented made, constructed and applied to use a new and useful improvement in the machine for applying horse and other animal power to sundry mechanical purposes not known or used before this my said discovery which I specify and describe in the words figures and references following to wit: — The length and breadth of the machine is suited to accommodate the horse or horses or other animal or animals standing thereon to work it, say for a one horse machine, let it be about ten feet long by two feet wide or of any other size. Its side planks are secured together by by firm cross pieces. Between these side planks are three cylinders or trundles one at letter A. one at B. and one at C as represented in fig. 1. of the drawing accompanying this description, the pivots or gudgeons of which run into or through the above mentioned side planks, on the circumference of these cylinders are fixed several half circle cambs as represented by figure 3. The floor of the machine (on which the animal stands) is constructed of strips of wood or iron which I shall call slats so thin that the foot of a horse will cover 3-4 or more of them at one time - Every other slat in this floor is secured & framed together in one frame so as to make but one motion when it moves backward or forward & every of the remaining slats constituting another frame for another motion, all which is represented in fig. 2. letters A & B except several cross pieces underneath which are not seen in the drawing. These two frames rise and fall alternately (when the machine is running) by meeting the half circular cambs before mentioned on the revolving cylinders under the floor. Two slats extend from each of the above mentioned frames along each side of the eccentric or camb wheels D and E and beyond them. On the ends of each pair of these extended slats are three little rollers the middle one of which in each pair by pressing against the periphery of the camb wheel while the horse draws (commencing at point A, in fig. 4) gives it motion in the direction of

1236

8689X the same till point B is reached by the roller when the motion is continued by the opposite point on the other wheel being operated on by the other middle roller in the same manner and so on — Thus a rotary motion is communicated to the shaft F. fig. 4 repre-sents, the shape of the camb or eccentric wheels — the farthest points from the center & the largest periphery of each half wheel being reversed or on opposite side of the shaft —

While the rollers which give motion to said wheels are passing point A, the frame bear-ing it just begins to rise. At this precise instant of time, both frames are moving in one direction to wit, backwards until the frame farthest backs receding from the cambs underneath which support it, the upper frame is brought uppermost against the feet of the operating animal and in its turn carried back; and soon in alternate succession — the distance of the rise and fall of the two frames being just enough to allow the one moving forward to go clear of the animals feet. The forward motion of the frame is caused by the camb wheels alternately drawing them forward by the pressure of the shortest periphery of each wheel, against the middle roller of one frame, during ~~during~~ the time its mate frame is moving backwards by the direct power of the op-erating animal. To make the forward motion easy, there are two or more friction cylinders under the floor upon which each frame falls in receding from the cambs on the cylinders first described. G. H. I. K. are rollers on the ends of the slats before de-scribed running upon suitable bearers to prevent friction. The cylynders or trundles under the floor are made to revolve evenly and uniformly by means of the pitman (letter L. fig. 1.) secured to the cranks on the gudgeons of the trundles. Their motion is made to correspond with the motion of shaft F. by means of another pitman on the opposite side of the frame (see fig. 2. letter C) secured to a crank on the gudgeon of the middle trundle & to another crank on the gudgeon of shaft F. running between two rol-lers at letter G. O is a fly or balance wheel —

The horse or other animal is placed and drawn upon the floor in the usual man-ner & motion is communicated for any purpose by means of a common band or a cog wheel — Your petitioner would observe that there are several ways in which the motion of his machine can be produced beside the one by him described to wit, by means of a crank a spring & weight by a particular kind or manner of gearing &c. but the manner by your petitioners described is the best one — .

— What your petitioner claims as new and as his invention and for what he asks an exclusive right and privilege in, is, the combination and arrangement of

8689X the several parts of his machine as herein before described, and also the new principle of a flat floor so constructed as to apply horse or other animal power upon it in producing any motion used for mechanical or other purposes—

Dated at Middletown in said County of Middlesex this 9th day of October A.D. 1834.

Witnesses

Wm Goodrich
Saml W. Griswold

William E. Arnold

Exd
W.G.

(1084 wds.)

(Drawing)